US010303894B2

(12) United States Patent
Ahmed et al.

(10) Patent No.: US 10,303,894 B2
(45) Date of Patent: May 28, 2019

(54) FINE-GRAINED ACCESS CONTROL FOR DATA MANIPULATION LANGUAGE (DML) OPERATIONS ON RELATIONAL DATA

(71) Applicant: Oracle International Corporation, Redwood Shores, CA (US)

(72) Inventors: Tanvir Ahmed, Belmont, CA (US); Yi Ru, Belmont, CA (US); Chao Liang, San Ramon, CA (US); Vikram Reddy Pesati, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 262 days.

(21) Appl. No.: 15/253,608

(22) Filed: Aug. 31, 2016

(65) Prior Publication Data
US 2018/0060603 A1 Mar. 1, 2018

(51) Int. Cl.
*G06F 17/30* (2006.01)
*G06F 21/62* (2013.01)
*H04L 29/06* (2006.01)

(52) U.S. Cl.
CPC ...... *G06F 21/6227* (2013.01); *G06F 17/3056* (2013.01); *G06F 17/30377* (2013.01); *G06F 17/30595* (2013.01); *H04L 63/101* (2013.01)

(58) Field of Classification Search
None
See application file for complete search history.

(56) References Cited

U.S. PATENT DOCUMENTS

| 4,586,134 A | 4/1986 | Norstedt |
| 4,664,528 A | 2/1987 | Ahmed et al. |
| 4,823,122 A | 4/1989 | Mann et al. |

(Continued)

FOREIGN PATENT DOCUMENTS

EP          1564620          1/2005

OTHER PUBLICATIONS

U.S. Appl. No. 12/484,977, filed Jun. 15, 2009, Notice of Allowance, dated May 28, 2013.

(Continued)

*Primary Examiner* — Debbie M Le
(74) *Attorney, Agent, or Firm* — Hickman Palermo Becker Bingham LLP

(57) ABSTRACT

Embodiments allow, within database security policies, the grant of data change operation-specific privileges to particular users to be applied within particular data realms in a given table. Furthermore, according to one or more embodiments, User Privilege column-level privileges are explicitly associated with one or more data access operations such that the grant of such a column-level privilege allows the user to perform only those data access operations that are explicitly associated with the column-level privilege. Enforcement of the data security policies includes prevention of data leakage via WHERE and RETURNING INTO clauses. According to one or more embodiments, a two-phase rewrite is used to optimize enforcement of column-level privileges. During the two-phase rewrite of a given query, the privileges checked during enforcement of the User Privilege data security policies are pruned to avoid unnecessary privilege checks given the columns that are accessed in the query.

22 Claims, 10 Drawing Sheets

100

(56) References Cited

U.S. PATENT DOCUMENTS

| | | | |
|---|---|---|---|
| 5,047,922 A | 9/1991 | Borkar | |
| 5,247,671 A | 9/1993 | Adkins et al. | |
| 5,289,461 A | 2/1994 | De Nijs | |
| 5,319,754 A | 6/1994 | Meinecke et al. | |
| 5,392,285 A | 2/1995 | Kurts | |
| 5,448,559 A | 9/1995 | Hayter et al. | |
| 5,530,905 A | 6/1996 | Niuchols et al. | |
| 5,553,239 A | 9/1996 | Heath et al. | |
| 5,553,242 A | 9/1996 | Russell et al. | |
| 5,596,745 A | 1/1997 | Lai et al. | |
| 5,598,536 A | 1/1997 | Slaughter, III et al. | |
| 5,600,722 A | 2/1997 | Yamaguchi et al. | |
| 5,600,791 A | 2/1997 | Carlson et al. | |
| 5,617,540 A | 4/1997 | Civanlar et al. | |
| 5,633,861 A | 5/1997 | Hanson et al. | |
| 5,642,515 A | 6/1997 | Jones et al. | |
| 5,682,534 A | 10/1997 | Kapoor et al. | |
| 5,684,800 A | 11/1997 | Dobbins et al. | |
| 5,734,659 A | 3/1998 | Mann et al. | |
| 5,740,175 A | 4/1998 | Wakeman et al. | |
| 5,761,507 A | 6/1998 | Govett | |
| 5,771,349 A | 6/1998 | Picazo, Jr. et al. | |
| 5,774,660 A | 6/1998 | Brendel et al. | |
| 5,774,668 A | 6/1998 | Choquier et al. | |
| 5,790,800 A | 8/1998 | Gauvin et al. | |
| 5,805,816 A | 9/1998 | Picazo et al. | |
| 5,805,827 A | 9/1998 | Chau et al. | |
| 5,805,920 A | 9/1998 | Sprenkle et al. | |
| 5,828,879 A | 10/1998 | Bennett | |
| 5,944,823 A | 8/1999 | Jade et al. | |
| 5,963,556 A | 10/1999 | Varghese et al. | |
| 5,974,463 A | 10/1999 | Warrier et al. | |
| 5,978,849 A | 11/1999 | Khanna | |
| 5,987,430 A | 11/1999 | Van Horne et al. | |
| 6,006,264 A | 12/1999 | Colby et al. | |
| 6,088,728 A | 7/2000 | Bellemore et al. | |
| 6,138,120 A | 10/2000 | Gongwer et al. | |
| 6,310,883 B1 | 10/2001 | Mann et al. | |
| 6,321,235 B1 | 11/2001 | Bird | |
| 6,950,848 B1 | 9/2005 | Yousefi'zadeh | |
| 7,039,654 B1 | 5/2006 | Eder | |
| 7,136,825 B2 | 11/2006 | Araki et al. | |
| 7,174,379 B2 | 2/2007 | Agarwal et al. | |
| 7,346,690 B1 | 3/2008 | Sinha et al. | |
| 7,506,034 B2 | 3/2009 | Coates et al. | |
| 7,512,686 B2 | 3/2009 | Berg | |
| 7,831,570 B2* | 11/2010 | Sack | G06F 21/6227 707/694 |
| 7,958,150 B2* | 6/2011 | Bird | G06F 21/6227 707/785 |
| 8,549,038 B2 | 10/2013 | Narasinghanallur et al. | |
| 8,732,856 B2* | 5/2014 | Sack | G06F 21/6227 707/783 |
| 9,043,309 B2 | 5/2015 | Ahmed | |
| 9,654,474 B2* | 5/2017 | Peretti | H04L 63/105 |
| 2001/0027406 A1 | 10/2001 | Araki et al. | |
| 2002/0111942 A1 | 8/2002 | Campbell | |
| 2002/0147652 A1 | 10/2002 | Gheith et al. | |
| 2003/0065986 A1 | 4/2003 | Fraenkel et al. | |
| 2003/0081748 A1 | 5/2003 | Lipinski | |
| 2003/0101116 A1 | 5/2003 | Rosko | |
| 2003/0172145 A1 | 9/2003 | Nguyen | |
| 2003/0187848 A1 | 10/2003 | Ghukasyan et al. | |
| 2003/0208523 A1 | 11/2003 | Gopalan et al. | |
| 2003/0212670 A1 | 11/2003 | Yalamanchi | |
| 2003/0229695 A1 | 12/2003 | Mc Bride | |
| 2004/0030801 A1 | 2/2004 | Moran et al. | |
| 2004/0117375 A1 | 6/2004 | Saha et al. | |
| 2004/0176996 A1 | 9/2004 | Powers et al. | |
| 2004/0205101 A1 | 10/2004 | Radhakrishnan | |
| 2004/0221031 A1 | 11/2004 | Desai | |
| 2004/0257985 A1 | 12/2004 | Sahai et al. | |
| 2005/0038828 A1 | 2/2005 | Kaluskar | |
| 2005/0038833 A1 | 2/2005 | Colrain et al. | |
| 2005/0246338 A1 | 11/2005 | Bird | |
| 2005/0262183 A1 | 11/2005 | Colrain et al. | |
| 2006/0026286 A1 | 2/2006 | Lei | |
| 2006/0143217 A1 | 6/2006 | Stanev | |
| 2007/0027896 A1 | 2/2007 | Newport | |
| 2007/0276835 A1* | 11/2007 | Murthy | G06F 21/6227 |
| 2007/0283021 A1 | 12/2007 | Wong | |
| 2008/0027769 A1 | 1/2008 | Eder | |
| 2008/0071785 A1 | 3/2008 | Kabra | |
| 2008/0155688 A1 | 6/2008 | Casazza | |
| 2008/0168529 A1 | 7/2008 | Anderson | |
| 2009/0182747 A1* | 7/2009 | Bird | G06F 21/6227 |
| 2009/0276824 A1 | 11/2009 | Rafiq | |
| 2010/0036846 A1* | 2/2010 | Rafiq | G06F 17/30306 707/783 |
| 2010/0169377 A1 | 7/2010 | Galeazzi | |
| 2010/0250712 A1 | 9/2010 | Ellison | |
| 2010/0318570 A1 | 12/2010 | Narasinghanallur | |
| 2011/0208757 A1 | 8/2011 | Hung | |
| 2012/0330925 A1* | 12/2012 | Ramamurthy | G06F 17/30448 707/718 |
| 2013/0086652 A1 | 4/2013 | Kavantzas | |
| 2013/0117313 A1 | 5/2013 | Miao et al. | |
| 2013/0238659 A1 | 9/2013 | Roitman | |
| 2013/0325841 A1 | 12/2013 | Ahmed | |
| 2014/0006344 A1 | 1/2014 | Narasinghanallur | |
| 2014/0188938 A1 | 7/2014 | Banks | |
| 2014/0331337 A1 | 11/2014 | Factor | |
| 2015/0020147 A1 | 1/2015 | Krishnan | |
| 2015/0371018 A1 | 12/2015 | Ahmed et al. | |
| 2017/0147592 A1* | 5/2017 | Barbas | G06F 17/30117 |

OTHER PUBLICATIONS

U.S. Appl. No. 13/488,739, filed Jun. 5, 2012, Office Action, dated Apr. 16, 2014.
U.S. Appl. No. 14/315,288, filed Jun. 25, 2014, Final Office Action, dated Mar. 30, 2016.
U.S. Appl. No. 14/315,288, filed Jun. 25, 2014, Office Action, dated Sep. 4, 2015.
U.S. Appl. No. 14/315,280, filed Jun. 25, 2014, Office Action, dated Mar. 29, 2016.
U.S. Appl. No. 14/315,280, filed Jun. 25, 2014, Final Office Action, dated Jul. 15, 2016.
U.S. Appl. No. 14/014,302, filed Aug. 29, 2013, Office Action, dated Apr. 14, 2016.
U.S. Appl. No. 14/014,302, filed Aug. 29, 2013, Notice of Allowance, dated Jul. 12, 2016.
U.S. Appl. No. 14/014,302, filed Aug. 29, 2013, Interview Summary, dated Jun. 9, 2016.
U.S. Appl. No. 13/488,739, filed Jun. 5, 2012, Notice of Allowance, dated Dec. 18, 2014.
U.S. Appl. No. 13/488,739, filed Jun. 5, 2012, Notice of Allowance, dated Aug. 28, 2014.
U.S. Appl. No. 12/484,977, filed Jun. 15, 2009, Office Action, dated Jun. 28, 2011.
U.S. Appl. No. 12/484,977, filed Jun. 15, 2009, Final Office Action, dated Nov. 22, 2011.
Sellis, Tim, "Multiple-query Optimization" dated Mar. 1988.

\* cited by examiner

┌─ 202
RECEIVE ONE OR MORE DATA DEFINITION LANGUAGE (DDL) STATEMENTS THAT ESTABLISH ONE OR MORE PRIVILEGE RULES THAT ASSIGN AN OPERATION-SPECIFIC PRIVILEGE, TO PERFORM A PARTICULAR DATA CHANGE OPERATION, TO A PARTICULAR USER WITHIN A PARTICULAR SET OF ROWS IN A PARTICULAR TABLE WITHIN A DATABASE

↓

┌─ 204
RECEIVE A DATA MANIPULATION LANGUAGE (DML) STATEMENT, FROM THE PARTICULAR USER, THAT PERFORMS THE PARTICULAR DATA CHANGE OPERATION OVER DATA STORED WITHIN THE PARTICULAR SET OF ROWS

↓

┌─ 206
BASED, AT LEAST IN PART, ON THE ONE OR MORE PRIVILEGE RULES, ALLOWING THE PARTICULAR DATA CHANGE OPERATION OVER THE DATA STORED WITHIN THE PARTICULAR SET OF ROWS

| EMP_ID | NAME | JOB_ID | SALARY | DEPT_ID | |
|---|---|---|---|---|---|
| 100 | Steven | AD_PRES | 24000 | 90 | 302 |
| 101 | Neena | AD_VP | 17000 | 90 | |
| 103 | Alexander | IT_PROG | 6000 | 60 | |
| 104 | Bruce | IT_PROG | 4800 | 60 | 304 |
| 108 | Nancy | FL_MGR | 12008 | 100 | |
| 109 | Daniel | FL_MGR | 9000 | 100 | |

310                                                                  312

| EMP_ID | NAME | JOB_ID | SALARY | DEPT_ID | |
|---|---|---|---|---|---|
| 100 | Steven | AD_PRES | 24000 | 1090 | 302 |
| 101 | Neena | AD_VP | 17000 | 1090 | |
| 103 | Alexander | IT_PROG | 6000 | 60 | |
| 104 | Bruce | IT_PROG | 4800 | 60 | 304 |
| 108 | Nancy | FL_MGR | 12008 | 100 | |
| 109 | Daniel | FL_MGR | 9000 | 100 | |

| | | manageJob (322) | manageSalary (324) | |
|---|---|---|---|---|
| EMP_ID | NAME | JOB_ID | SALARY | DEPT_ID |
| 100 | Steven | AD_PRES | 24000 | 90 |
| 101 | Neena | AD_VP | 17000 | 90 |
| 103 | Alexander | IT_PROG | 6000 | 60 |
| 104 | Bruce | IT_PROG | 4800 | 60 |
| 108 | Nancy | FL_MGR | 12008 | 100 |
| 109 | Daniel | FL_MGR | 9000 | 100 |

302: rows 100, 101
304: rows 103, 104, 108, 109

330

| | | manageJob (322) | manageSalary (324) | | 332 |
|---|---|---|---|---|---|
| EMP_ID | NAME | JOB_ID | SALARY | DEPT_ID | |
| 100 | Steven | AD_PRES | 24010 | 90 | |
| 101 | Neena | AD_VP | 17010 | 90 | |
| 103 | Alexander | IT_PROG | 6000 | 60 | |
| 104 | Bruce | IT_PROG | 4800 | 60 | |
| 108 | Nancy | FL_MGR | 12008 | 100 | |
| 109 | Daniel | FL_MGR | 9000 | 100 | |

302: rows 100, 101
304: rows 103, 104, 108, 109

| | | 322 manageJob | 324 manageSalary | 342 |
|---|---|---|---|---|
| EMP_ID | NAME | JOB_ID | SALARY | DEPT_ID |
| 100 | Steven | AD_PRES | 24000 | 1090 |
| 101 | Neena | AD_VP | 17000 | 1090 |
| 103 | Alexander | IT_PROG | 6000 | 1060 |
| 104 | Bruce | IT_PROG | 4800 | 1060 |
| 108 | Nancy | FL_MGR | 12008 | 1100 |
| 109 | Daniel | FL_MGR | 9000 | 1100 |

302: rows 100, 101
304: rows 103, 104, 108, 109

350

| | | 322 manageJob | 324 manageSalary | |
|---|---|---|---|---|
| EMP_ID | NAME | JOB_ID | SALARY | DEPT_ID |
| 100 | Steven | AD_PRES | 24000 | 90 |
| 101 | Neena | AD_VP | 17000 | 90 |
| 102 | Lex | AD_VP | 17000 | 90 |
| 103 | Alexander | IT_PROG | 6000 | 60 |
| 104 | Bruce | IT_PROG | 4800 | 60 |
| 108 | Nancy | FL_MGR | 12008 | 100 |
| 109 | Daniel | FL_MGR | 9000 | 100 |

352 points to SALARY of row 101.

302: rows 100, 101, 102
304: rows 103, 104, 108, 109

| EMP_ID | NAME | JOB_ID (manageJob) 322 | SALARY (manageSalary) 324 | DEPT_ID |
|---|---|---|---|---|
| 100 | Steven | AD_PRES | 24000 | 90 |
| 101 | Neena | AD_VP | 362— 17000 | 90 |
| ~~102~~ | ~~Lex~~ | ~~NULL~~ | ~~NULL~~ | ~~60~~ |
| 103 | Alexander | IT_PROG | 6000 | 60 |
| 104 | Bruce | IT_PROG | 4800 | 60 |
| 108 | Nancy | FL_MGR | 12008 | 100 |
| 109 | Daniel | FL_MGR | 9000 | 100 |

302 (rows 100, 101, 102)
304 (rows 102, 103, 104, 108, 109)

370

| EMP_ID | NAME | JOB_ID (manageJob) 322 | SALARY (manageSalary) 324 | DEPT_ID |
|---|---|---|---|---|
| 100 | Steven | AD_PRES | 24000 | 90 |
| 101 | Neena | AD_VP | 17000 | 90 |
| 103 | Alexander | IT_PROG | 6000 | 60 |
| 104 | Bruce | IT_PROG | 4800 | 60 |
| 108 | Nancy | FL_MGR | 12008 | 100 |
| 109 | Daniel | FL_MGR | 9000 | 100 |

372 (rows 100, 101)
374 (rows 103, 104, 108, 109)

FIG. 3E

380
         322         324
         manageJob  manageSalary

| EMP_ID | NAME | JOB_ID | SALARY | DEPT_ID |
|---|---|---|---|---|
| | | 382 | | |
| 100 | Steven | ////TEST//// | 24000 | 90 |
| 101 | Neena | ////TEST//// | 17000 | 90 |
| 103 | Alexander | ////TEST//// | ////10000//// | 60 |
| 104 | Bruce | ////TEST//// | ////10000//// | 60 |
| 108 | Nancy | FL_MGR | ////10000//// | 100 |
| 109 | Daniel | FL_MGR | ////10000//// | 100 |

372 (rows 100, 101)
374 (rows 103, 104, 108, 109)
384 — salary cell 390
         322         324
         manageJob  manageSalary

| EMP_ID | NAME | JOB_ID | SALARY | DEPT_ID |
|---|---|---|---|---|
| 100 | Steven | AD_PRES | 24000 | 90 |
| 101 | Neena | AD_VP | 17000 | 90 |
| 103 | Alexander | ////TEST//// | ////10000//// | 60 |
| 104 | Bruce | ////TEST//// | ////10000//// | 60 |
| 108 | Nancy | FL_MGR | 12008 | 100 |
| 109 | Daniel | FL_MGR | 9000 | 100 |

372 (rows 100, 101)
374 (rows 103, 104, 108, 109)
392 — salary cell

┌─ 502
MAINTAIN, FOR A PARTICULAR TABLE WITHIN A DATABASE, A PLURALITY OF COLUMN-LEVEL PRIVILEGES, WHEREIN EACH OF THE PLURALITY OF COLUMN-LEVEL PRIVILEGES PROTECTS A RESPECTIVE COLUMN OF THE PARTICULAR TABLE

↓

┌─ 504
RECEIVE A DATA MANIPULATION LANGUAGE (DML) STATEMENT THAT PERFORMS A DATA CHANGE OPERATION OVER DATA IN THE PARTICULAR TABLE

↓

┌─ 506
REWRITE THE DML STATEMENT TO PRODUCE A FIRST UPDATED DML STATEMENT THAT REFERENCES EACH OF THE PLURALITY OF COLUMN-LEVEL PRIVILEGES

↓

┌─ 508
REWRITE THE FIRST UPDATED DML STATEMENT TO PRODUCE A SECOND UPDATED DML STATEMENT THAT REFERENCES A STRICT SUBSET OF THE PLURALITY OF COLUMN-LEVEL PRIVILEGES; WHEREIN EACH COLUMN, PROTECTED BY EACH COLUMN-LEVEL PRIVILEGE OF THE STRICT SUBSET OF THE PLURALITY OF COLUMN-LEVEL PRIVILEGES, IS ACCESSED BY THE DML STATEMENT

↓

┌─ 510
EXECUTE THE SECOND UPDATED DML STATEMENT

FINE-GRAINED ACCESS CONTROL FOR DATA MANIPULATION LANGUAGE (DML) OPERATIONS ON RELATIONAL DATA

CROSS-REFERENCE TO RELATED APPLICATIONS

This application is related to the following patent documents, the entire contents of each of which are incorporated by reference as if fully set forth herein:
U.S. Pat. No. 9,043,309, filed Jun. 5, 2012 and issued May 26, 2015, titled "SQL Transformation-Based Optimization Techniques For Enforcement Of Data Access Control";
U.S. Pat. No. 8,549,038, filed Jun. 15, 2009 and issued Oct. 1, 2013, titled "Pluggable Session Context";
U.S. patent application Ser. No. 14/014,302, filed Aug. 29, 2013, titled "Pluggable Session Context";
U.S. patent application Ser. No. 14/315,288, filed Jun. 25, 2014, titled "Asserting Identities Of Application Users In A Database System Based On Delegated Trust";
U.S. patent application Ser. No. 14/313,872, filed Jun. 24, 2014, titled "Optimized Enforcement Of Fine Grained Access Control On Data"; and
U.S. patent application Ser. No. 14/315,280, filed Jun. 25, 2014, titled "Integrating A User's Security Context In A Database For Access Control".

FIELD OF THE INVENTION

The present invention relates to resource access control for relational data and, more specifically, to fine-grained access control for data manipulation operations, specifically update, insert, and delete, over relational data.

BACKGROUND

Implementing access control within a database management system (DBMS) places restrictions on which users have access to specific systems, resources, and applications connected to the DBMS. An access control model is a set of criteria that a system administrator utilizes to define system users' rights to access particular data within a database.

One access control model uses SQL GRANT statements to indicate which users have the right to access particular target objects. The GRANT statement supports columns as the target object for an object privilege, as shown in the following example:
GRANT <privilege> ON <object> (<column> . . . ) TO <grantee list>
However, a GRANT statement is generally only supported for INSERT, UPDATE, and REFERENCE privileges. In addition, a GRANT statement only allows column-level DML, privilege, and a user can be only granted privilege on all the values of the column. Hence this model does not support allowing DML operations on only part of the values within a column.

Another access control model is the Virtual Private Database (VPD) model, which allows granting DML privileges on a subset of the values of a column in a particular table by associating a policy PL/SQL function to the particular table. Administration of fine-grained access control (or control that allows operation over only part of a column of data) with VPD can be cumbersome, since the PL/SQL policy function that defines access control privileges for a given table must be developed with procedural logic to identify those rows in which a particular column-level DML operation is allowed.

Furthermore, using VPD for fine grained access control on DML operations when multiple columns of a table are involved is complicated, since VPD only allows a single policy function to be defined for a given VPD policy on a table. The PL/SQL function defined in the policy for the table is applied to all of the columns in the table. To enforce different policy functions on different columns of a particular table, multiple VPD policies are needed. Thus, in order to implement column-level SELECT privileges on multiple columns of a given table, multiple VPD policies are implemented, with different PL/SQL functions, using the same VPD statement type (i.e., SELECT). Because VPD polices are always ANDed, column-level DML policies can only be expressed for rows where all the column policies are satisfied for the row.

Yet another access control model is the User Privilege model, which allows fine-grained access control on a database object (table or view). (fine-grained means column-level privilege.) The User Privilege model provides fine-grained access control for table data by allowing definition of column-level privileges and also by allowing row-sets in the table to be paired with access control lists (ACLs).

A row-set is represented with a SQL predicate and is termed a "data realm". An ACL includes information indicating grants or denials of privileges to user roles and/or to particular users. Privileges that may be granted include SELECT privileges and column-level privileges described in further detail below. In this way, data realm and ACL pairs comprise a data security policy that dictates what cells are and are not included in a results set to a given user.

During execution of a user's query over a given table, the table, which is the object of the query, is replaced with a view definition. For each protected column, the view definition introduces a virtual column that represents the original value of an associated column from the table, which value is only shown to the user that submitted the query if the user is authorized based on the applicable data security policy.

As such, currently, User Privilege data security policies are only applicable for fine-grained access control of SELECT privileges, and it is infeasible for data change operation-type privileges (such as privileges for INSERT, UPDATE, and DELETE operations) to be enforced using User Privilege data access policies. Specifically, replacing the object of an executed statement with a view definition that represents values in the table with virtual columns, as described above, cannot be used for fine-grained access control on data change type access modes because data change operations cannot be enforced on virtual columns (since such operations on virtual columns are not defined).

As such, it would be beneficial to enforce a user privilege-type access control model, such as User Privilege, that allows fine-grained control of data change operations without requiring development of cumbersome PL/SQL functions to implement data security policies and attaching the functions to individual tables, as with VPD.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings.

FIG. 2 depicts a flowchart for defining privilege rules for a particular table using DDL statements, receiving a DML statement to execute over the table, and allowing the operation performed by the DML statement to apply to data in the table according to the defined privilege rules.

FIGS. 3A-3E depict a sample tables and results tables with employee record data stored within a relational database.

FIG. 5 depicts a flowchart for enforcing fine-grained access control via a two-phase statement rewrite.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Embodiments allow, within database security policies, the grant of data change operation-specific privileges to particular users to be applied within particular data realms in a given table. Furthermore, according to one or more embodiments, column-level privileges are explicitly associated with particular data access operations such that the grant of such a column-level privilege allows the user to perform only those data access operations that are explicitly associated with the column-level privilege. As such, embodiments provide fine-grained access control based on the intersection between columns and data realms. According to one or more embodiments, enforcement of the data security policies includes prevention of data leakage via WHERE and RETURNING INTO clauses.

Enforcement of the data security policies involves query rewrite to enforce those data policies that are applicable to a given query. The query rewrite for a given DML, statement transforms the table, which is the object of the DML statement, to a view definition that restricts application of the operation of the DML statement to only that data, within the table, on which the user issuing the statement has the privilege to perform the particular operation (SELECT, INSERT, DELETE, UPDATE).

According to one or more embodiments, a two-phase rewrite is used to optimize enforcement of column-level privileges. During the two-phase rewrite of a given query, the privileges checked during enforcement of the data security policies are pruned to avoid unnecessary privilege checks given the columns that are accessed in the query.

Figure 1:
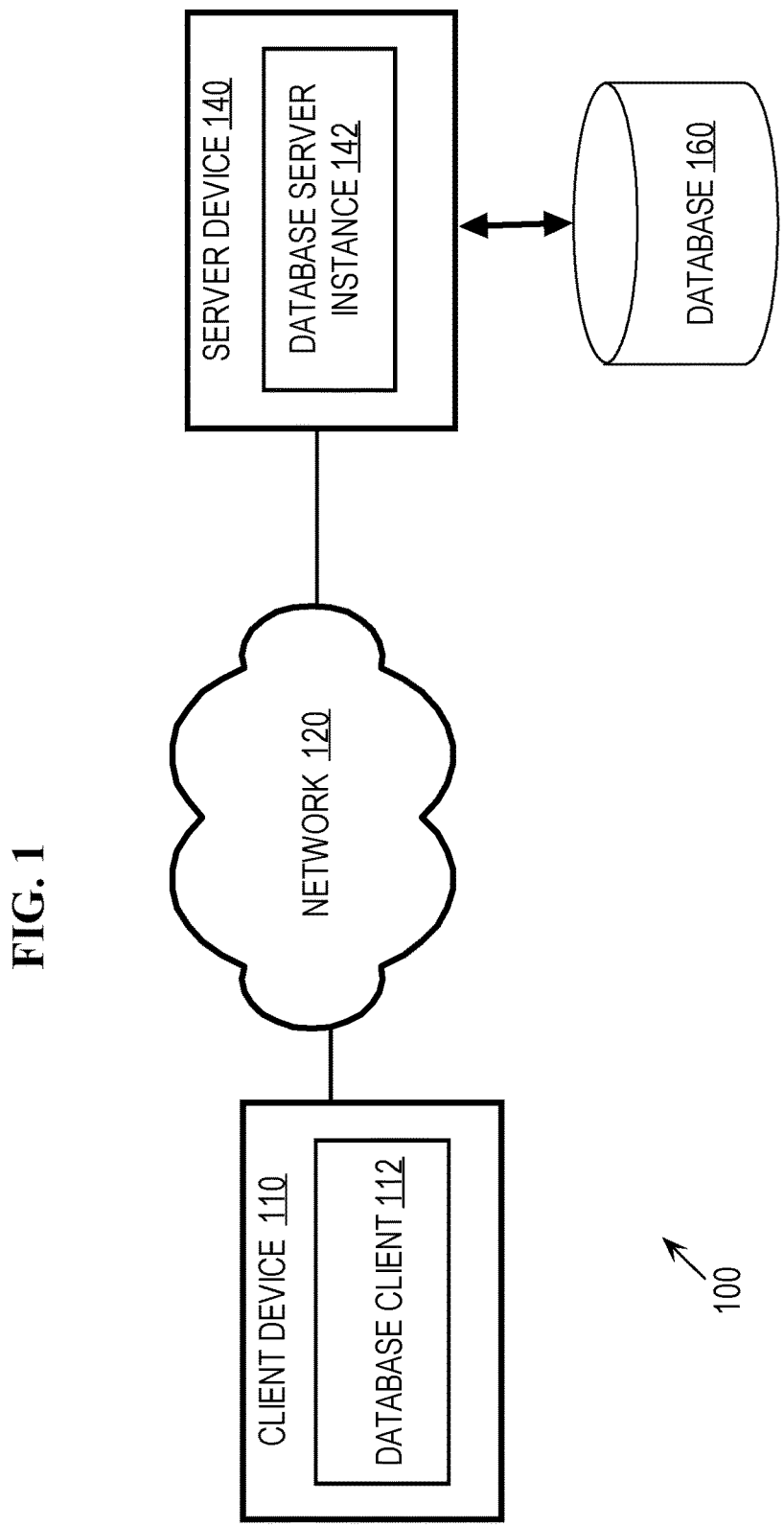
FIG. 1 is a block diagram that depicts an example network arrangement for enforcing fine-grained access control for DML, operations.

Architecture for Enforcing Fine-Grained Access Control for Data Manipulation Language Operations FIG. 1 is a block diagram that depicts an example network arrangement 100 for enforcing fine-grained access control for DML operations, according to one or more embodiments. Network arrangement 100 includes a client device 110 and a server device 140 communicatively coupled via a network 120. Example network arrangement 100 may include other devices, including client devices, server devices, storage devices, and display devices, according to one or more embodiments.

Client device 110 may be implemented by any type of computing device that is communicatively connected to network 120. Example implementations of client device 110 include, without limitation, workstations, personal computers, laptop computers, personal digital assistants (PDAs), tablet computers, cellular telephony devices such as smart phones, and any other type of computing device.

In network arrangement 100, client device 110 is configured with a database client 112. Database client 112 may be implemented in any number of ways, including as a stand-alone application running on client device 110, or as a plugin to a browser running at client device 110, etc. Client device 110 may be configured with other mechanisms, processes and functionalities, depending upon a particular implementation.

Network 120 may be implemented with any type of medium and/or mechanism that facilitates the exchange of information between client device 110 and one or more of server device 140. Furthermore, network 120 may facilitate use of any type of communications protocol, and may be secured or unsecured, depending upon the requirements of a particular embodiment.

According to one or more embodiments, server device 140 implements a single-server database management system. According to one or more embodiments, server device 140 is a node in a cluster of nodes managed by multi-node DBMSs, e.g., a shared-everything cluster database environment (such as Oracle Real Application Clusters ("RAC")). (See "Oracle Real Application Clusters (RAC)", An Oracle White Paper, June 2013, Oracle Database 12C documentation. This document is incorporated by reference as if fully set forth herein.) According to one or more embodiments, any number of nodes may be part of a node cluster managed by a multi-node DBMS. Specifically, resources from multiple nodes in a multi-node database system can be allocated to run a particular database server's software.

Server device 140 is implemented by any type of computing device that is capable of communicating with client device 110 over network 120 and also capable of running a database server instance. In network arrangement 100, server device 140 is configured with a database server instance 142.

A database server instance (or "instance") is a server that comprises a combination of the software and allocation of resources from a node. Specifically, a server, such as a database server, is a combination of integrated software components and an allocation of computational resources, such as memory, a node (i.e., a computing device), and/or processes on the node for executing the integrated software components on a processor, the combination of the software and computational resources being dedicated to performing a particular function on behalf of one or more clients (such as database client 112 on client device 110).

Database server instance 142 on server device 140 maintains access to and manages data in database 160. According to one or more embodiments, access to a given database comprises access to (a) a set of disk drives storing data for the database, and (b) data blocks stored thereon. Database 160 may reside in any type of storage, including volatile and non-volatile storage, e.g., random access memory (RAM), one or more hard disks, main memory, etc.

One or more of the functions attributed to processes running on server device 140, as described herein, may be performed by services on other server devices that are communicatively coupled to network 120. Furthermore, any of the functionality attributed to database client 112 and database server instance 142 herein may be performed by any other logical entity of network arrangement 100, according to one or more embodiments. Also, database server instance 142 may be implemented by one or more logical modules, and are described in further detail below. Server device 140 may be configured with other mechanisms, processes and functionalities, depending upon a particular implementation.

In an embodiment, each of the processes and/or functionality described in connection with database client 112, database server instance 142, and/or database 160 are performed automatically and may be implemented using one or more computer programs, other software elements, and/or digital logic in any of a general-purpose computer or a special-purpose computer, while performing data retrieval, transformation, and storage operations that involve interacting with and transforming the physical state of memory of the computer.

Database Systems

Embodiments of the present invention are used in the context of database management systems. Therefore, a description of a DBMS is useful. A DBMS manages a database. A DBMS may comprise one or more database servers. A database comprises database data and a database dictionary that are stored on a persistent memory mechanism, such as a set of hard disks. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Users may interact with an instance of a database server of a DBMS by submitting, to the database server instance, commands that cause the database server instance to perform operations on data stored in a database. For example, a user at client device 110 submits, via database client 112, a database command to database server instance 142 with which database client 112 maintains a connection. A user may be one or more applications running on client device 110 that cause database client 112 to interact with database server instance 142. Multiple parties may access database resources through a given application. Multiple parties and/or users may also be referred to herein, collectively, as a user.

Database Queries

A user may submit database queries to a database session that connects the user to a database. Such database queries initiate one or more transactions that run over the database. A database query may be represented by a database statement that conforms to a database language.

Examples of database languages include a Structured Query Language (SQL) that conforms to American National Standards Institute (ANSI) standards. Data manipulation language (DML) instructions are issued to a DBMS to manage data stored within a database structure. SELECT, INSERT, UPDATE, and DELETE are common examples of DML instructions found in SQL implementations. Data definition language (DDL) statements are statements that cause performance of one or more of: create, alter, and drop schema objects; grant and revoke privileges and roles; analyze information on a table, index, or cluster; establish auditing options; and add comments to the data dictionary; etc.

PL/SQL is a procedural language that includes SQL statements within its syntax. PL/SQL is used herein as an example of such a procedural language, however, embodiments are not limited to usage of PL/SQL. Other examples of procedural languages that extend SQL standards include Transact-SQL, PL/pgSQL, and SQL Procedural Language.

Real Application Security

As previously stated, a User Privilege model is an access control model used to control user access to data within a relational database. One non-limiting example of a User Privilege model is Oracle Real Application Security (RAS). More information about RAS is found in "Oracle Database 12c: Real Application Security", An Oracle White Paper, September 2014, located at the time of drafting as wp-security-ras12c-2312936.pdf at http://www.oracle.com/technetwork/database/security/real-application-security, the entire contents of which are hereby incorporated by reference as if fully set forth herein.

The User Privilege data access model is a policy-based authorization model that recognizes application-level users, privileges, and roles within the database, and then controls access on both static and dynamic collections of records. With built-in support for securely propagating application users' sessions to the database, User Privilege allows security policies on data to be expressed directly in terms of the application users, their roles and security contexts.

User Privilege Application Users and Application Sessions

User Privilege introduces the concept of application users within the database to represent application end-users. These users are schema-less and cannot own a database schema or object. However, similar to a database user, an application user can have a default schema for object name resolution. Database privileges can be granted to an application user through application roles.

Application users can be provisioned in an identity store as well as in the database. Application users accessing a 3-tier application are typically authenticated by the middle-tier, and their identity context is securely propagated to the database. For 2-tier applications for reporting, patching, maintenance, or other batch programs, application users can also directly connect and be authenticated by the database.

User Privilege Application Sessions represent the end users and their security context within the database and have a many-to-one association with a traditional database session. User Privilege employs the concept of attach and detach of a User Privilege Application Session to a database session ensuring that only the application user's security context is used for all relevant database operations.

On first login after authentication, a User Privilege application session is created for a user encapsulating the user identity and associated roles. Throughout the lifetime of this session, additional identity and authorization context can be associated to the session such as the organization of the user, the application initiating the operation, or the network IP address where the request originated. In a 3-tier web application, during the course of processing a user request, a database connection is acquired from a pool of database connections, and the User Privilege user application session is attached to the database connection. After attach, only the security context in the application session is used to authorize all database operations. As such, User Privilege constrains all interaction to the database only to the privileges associated with the application user session.

User Privilege Application Privileges and Application Roles

User Privilege Application security policies control application-level operations on application-specific business objects or entities. For example, a Human Resource application can define RequestLeave and ApproveLeave privileges to control the execution of application-level operations and their corresponding SQL actions—select, insert, delete, and update—on Employee Leave records. User Privilege provides SQL operators to check if an Application Privilege is authorized for a row of a database table or view. Similarly, application privileges can be defined to represent fine-grained object privileges such as ViewSSN that, e.g., represents the privilege to perform SELECT operations over data on the SSN column for the executing user's employee record.

Application security policies are typically specified using application roles, without knowing the users that will participate during the execution time of an application. For example, participants of a Manager role can approve leave requests. In this way, the security policies authorize all users that participate in the Manager role with the privilege of approving leave requests. User Privilege can define application roles and grant application privileges to these roles (or to individual users) in ACLs. Application roles can be granted to other application or database roles. During user provisioning, application roles are assigned to application users.

User Privilege Data Realms

A data realm represents a securable business object as a logical collection of data rows in an application table or a view. For example, a business object can be data sets that belong to an organization, department, geography, or related through some other association. The concept of data realm captures the typical business scenarios where access control requirements are associated with data sets representing business objects or entities. This collection or dataset is specified using a SQL predicate, where each row of the collection satisfies the predicate. For example, a data realm might be all the employee records, the records of employees that report to a specific manager, or only an employee's own record.

User Privilege Access Control Lists and Data Security Policies

A User Privilege ACL is a collection of privilege grants or Access Control Entries (ACE), where an ACE grants or denies privileges to an individual user or a user role. By aggregating privilege grants under an ACL, User Privilege simplifies authorization management. A privilege grant comprises an operation type that is allowed (e.g., SELECT, UPDATE, INSERT, DELETE) and/or a column-level privilege grant, as described in further detail below. A data security policy associates each data realm with an ACL. The data security policy is thus essentially a collection of data realms and their associated ACLs. By having both row and column level authorization, the User Privilege data access model provides fine-grained protection.

Fined Grained Access Control On DML Operations

According to one or more embodiments, instance 142 implements a User Privilege DML authorization model to effectuate fine-grained access control over relational data stored in database 160. FIG. 2 depicts a flowchart 200 for defining privilege rules for a particular table using DDL statements, receiving a DML, statement to execute over the table, and allowing the operation performed by the DML statement to apply to data in the table according to the defined privilege rules.

At step 202, one or more DDL statements are received, where the DDL statements establish one or more privilege rules that assign an operation-specific privilege to a particular user to perform a particular data change operation (i.e., INSERT, UPDATE, or DELETE) within a particular set of rows in a particular table within a database. For example, FIG. 3A depicts a sample table 300, HR.EMPLOYEES, with employee record data stored within database 160. Instance 142 receives one or more DDL statements that establish the following data security policies for HR.EMPLOYEES:

a first ACL (that grants UPDATE privilege to a user Ann) is mapped to data realm 302 defined by the SQL statement "Dept_Id=90"; and a second ACL (that grants SELECT privilege to the user role Managers, in which Ann participates) is mapped to a data realm 304 defined by the SQL statement "Dept_Id in (60, 100)".

In this way, based on the DDL statements, instance 142 establishes the data security policy that assigns the operation-specific privilege to perform UPDATE operations, to user Ann, within data realm 302 of HR.EMPLOYEES. Also, instance 142 also establishes the data security policy that assigns the operation-specific privilege to perform SELECT operations, to a user role (Managers) in which Ann participates (which effectively assigns the privilege to the participants of the user role Managers, which include Ann), within data realm 304 of HR.EMPLOYEES.

In the descriptions below, when a user executes a query over data in database 160, the user submits the query to a database session established to connect the user to database 160. Instance 142 executes the submitted query over the data in database 160 and returns results, to the user, via the database session.

At step 204, a DML statement is received from the particular user, where the DML statement performs the particular data change operation over data stored within the particular set of rows. For example, while Ann has UPDATE privilege for data realm 302 and SELECT privilege for data realm 304, Ann submits the following DML statement to the database session, which specifies the data change operation UPDATE over data stored within both data realms 302 and 304 as follows:

UPDATE hr.employees set dept_id=dept_id+1000;

According to one or more embodiments, data change operations include DML, statement types that change data stored in a database, such as INSERT, UPDATE, or DELETE.

At step 206, based, at least in part, on the one or more privilege rules, the particular data change operation is allowed over the data stored within the particular set of rows. For example, instance 142 executes the DML statement over table 300, which results in query results table 310. As part of executing the DML statement, instance 142 allows the UPDATE operation only within data realm 302 in which Ann has the right to perform the UPDATE operation. Since Ann is only granted SELECT privilege within data realm 304 (and is not granted UPDATE privilege in data realm 304), the values in the DEPT_ID column within realm 302 (as indicated in area 312) are updated and the values in the DEPT_ID column within realm 304 are not updated as a result of executing the statement.

According to a further example, one or more DDL statements, received by instance 142, establish manageJob privilege 322 and manageSalary privilege 324 to protect data in the JOB_ID and SALARY columns, respectively, of the HR.EMPLOYEES table as depicted in table 320 of FIG. 3B. Furthermore, the DDL statements establish the following data security policies for HR.EMPLOYEES table 320:

a first ACL (that grants UPDATE privilege and manageSalary privilege 324 to a user Ann) is mapped to data realm 302 defined by the SQL statement "Dept_Id=90"; and a second ACL (that grants UPDATE privilege and manageJob privilege 322 to the user role Managers, in which Ann participates) is mapped to a data realm 304 defined by the SQL statement "Dept_Id in (60, 100)".

While these data security policies are being enforced by instance 142, Ann submits the following DML statement to the database session established to connect her to database 160, where the DML statement updates the protected SALARY column within both data realms 302 and 304 of table 320 as follows:

UPDATE hr.employees set salary=salary+10;

As depicted in query results table 330, though Ann has the operation-specific privilege to perform UPDATE operations within both data realms 302 and 304, Ann only has column-level privilege for the protected SALARY column within data realm 302. Thus, only SALARY column values within data realm 302 (indicated within area 332) are updated by the DML, statement submitted by Ann.

Nevertheless, if Ann tries to update other unprotected columns such as EMP_ID or DEPT_ID, since the protected column SALARY and JOB_ID are not involved, manageJob privilege 322 and manageSalary privilege 324 are not enforced. For example, Ann executes the following DML statement over table 320, which updates the unprotected DEPT_ID column in table HR.EMPLOYEES (the result of which is depicted in query results table 340 of FIG. 3C):

UPDATE hr.employees set dept_id=dept_id+1000;

As depicted in results table 340, all values of the DEPT_ID column (as indicated by area 342) are updated by this DML statement.

Embodiments also require a column-level privilege check for INSERT statements. According to one or more embodiments, rows to be inserted into a given table must satisfy the data realm conditions associated with the privileges for columns of the table. If the data to be inserted does not satisfy all data realm conditions, an error is raised.

For example, one or more DDL statements, received by instance 142, establish the following data security policies for HR.EMPLOYEES table 320:

a first ACL (that grants INSERT privilege, manageJob privilege 322, and manageSalary privilege 324 to a user Ann) is mapped to data realm 302 defined by the SQL statement "Dept_Id=90"; and a second ACL (that grants INSERT privilege to the user role Managers, in which Ann participates) is mapped to a data realm 304 defined by the SQL statement "Dept_Id in (60, 100)".

While instance 142 enforces these data security policies, Ann executes the following statement over table 320 to insert a row in HR. EMPLOYEES:

INSERT into hr.employees values (102, 'Lex', 'AD_VP', 17000, 90);

As depicted in results table 350 of FIG. 3C, the operation successfully inserts a new row 352 into the table because Ann has both INSERT privilege in the realm into which the row is inserted, and also column-level privileges for all protected columns in the table.

In case of a selective INSERT statement that does not involve a protected column, column-level privileges are not invoked. In this case, the value of the protected column in such an inserted row will be a default value, or NULL if there is no default value. For example, while instance 142 enforces the above-enumerated data security policies, Ann executes the following operation over table 320 to insert a record without specifying a value for the SALARY or JOB_ID columns:

INSERT into hr.employees (EMP_ID, NAME, DEPT_ID) values (102, 'Lex', 60);

As depicted in results table 360 of FIG. 3D, though the INSERT statement inserts a row into realm 304 (since the DEPT_ID value is 60) for which Ann does not have manageJob privilege 322 or manageSalary privilege 324, the operation is successful because the operation does not specify a value for the protected columns JOB_ID and SALARY. As such, a new row 362 is successfully inserted into the table, where the values in protected columns JOB_ID and SALARY for the inserted record are NULL.

According to an embodiment, enforcement of data security policies by instance 142 adopts, for DELETE operations, the same semantics as described above for INSERT operations. According to another embodiment, enforcement of data security policies by instance 142 deals with DELETE operations as row-level operations. As such, for a DELETE statement, column-level privilege checks are not required and only row-level DELETE operation-specific privilege is needed.

To illustrate, one or more DDL statements, received by instance 142, establish the following data security policies for HR.EMPLOYEES table 320:

a first ACL (that grants DELETE privilege to a user Ann) is mapped to data realm 302 defined by the SQL statement "Dept_Id=90"; and a second ACL (that grants DELETE privilege and INSERT privilege to the user role Managers, in which Ann participates) is mapped to a data realm 304 defined by the SQL statement "Dept_Id in (60, 100)".

While instance 142 enforces these data security policies, Ann executes the following statement over table 320 to delete a row from HR.EMPLOYEES:

DELETE from hr.employees where emp_id=103;

Execution of this operation results in instance 142 deleting the indicated record, even though Ann does not have manageJob privilege 322 or manageSalary privilege 324 for data realm 304 that includes the deleted record.

Row Consistency and Column Consistency

Many times, fine-grained access control over DML operations on a particular table results in the ability to only partially fulfill a given operation. For example, a user updates a particular protected column within the table while the user is only granted UPDATE operation-specific privilege for a portion of the table. In this case, the UPDATE operation is only partially fulfilled (i.e., only the values within the data realm for which the user has UPDATE privilege are updated).

In some cases, partial fulfillment of an operation leaves individual records only partially updated. For example, FIG. 3D depicts a table 370 that is a version of HR.EMPLOYEES stored in database 160. One or more DDL statements, received by instance 142, establish the following data security policies for HR.EMPLOYEES table 370:

a first ACL (that grants UPDATE privilege and manageJob privilege 322 to a user Ann) is mapped to data realm 372 defined by the SQL statement "Dept_Id in (60, 90)"; and a second ACL (that grants UPDATE privilege and manageSalary privilege 324 to the user role Managers, in which Ann participates) is mapped to a data realm 374 defined by the SQL statement "Dept_Id in (60, 100)".

To be clear, table 370 depicts a first data realm 372 defined by the SQL statement "Dept_Id in (60, 90)" and a second data realm 374 defined by the SQL statement "Dept_Id in (60, 100)". ManageJob privilege 322 and manageSalary privilege 324 are as described in connection with table 320. As indicated above, Ann is granted UPDATE privilege for all the rows in both data realms; however Ann is granted manageJob privilege 322 only for data realm 372 and manageSalary privilege 324 only for data realm 374. Hence only for the rows intersected by these two data realm definitions, i.e., Dept_Id=60, Ann has privilege to update both of the protected columns in table 370.

While instance 142 enforces these data security policies for table 370, Ann executes the following UPDATE statement over table 370:

UPDATE hr.employees set job_id='TEST', salary=10000;

According to one embodiment, instance 142 performs the UPDATE operation on all authorized column values (i.e., instance 142 executes the operation as a cell-level operation). In this embodiment, execution of the above query produces query results table 380 of FIG. 3E, in which instance 142 updates the values in cell regions 382 and 384 and, in so doing, performs a partial record update for the rows where dept_id is 90 and 100. This behavior is the equivalent of executing the following individual column update statements over table 370:

UPDATE hr.employees set job_id='TEST';
UPDATE hr.employees set salary=10000;

According to another embodiment, instance 142 performs the update as a record-level operation, and only allows the update of a given record if all of the values in that record that are updated by the UPDATE statement are authorized to be updated. In this embodiment, the UPDATE statement depicted above, that changes both JOB_ID and SALARY values in all rows of table 370, causes instance 142 to modify only those records in which both JOB_ID and SALARY values can be modified (as depicted by cell region 392 in query results table 390 of FIG. 3E). Instance 142 disallows the UPDATE statement to update records in which the user does not have privilege to update any one of the JOB_ID or SALARY values.

Data Leakage Prevention

Embodiments also guard against indirect disclosure of privileged data, also called "data leakage". If only column-based privileges included in the select list for a given UPDATE statement are being enforced, then it is possible to ascertain the values of protected columns of a given table using the UPDATE statement. For example, Ann executes the following update statement over table 370 while Ann is granted UPDATE privilege for data realm 374 but is not granted manageSalary privilege 324 for data realm 374:

UPDATE hr.employees set emp_id=501 where SALARY=9000;

Since Ann has UPDATE privilege on data realm 374, i.e., where DEPT_ID in (60, 100), and the statement updates an unprotected column EMP_ID, the update statement succeeds when only column-based privileges included in the select list for the statement are enforced. However, execution of the UPDATE statement leaks salary information to Ann, even though Ann does not have column-level privilege for the SALARY values in data realm 374.

Thus, according to one or more embodiments, during execution of an UPDATE or DELETE type statement, instance 142 checks the SELECT privilege and column-level privileges for any data referred to within a WHERE clause of the statement. Since such a statement is conditional on the content of a protected column, instance 142 does not allow execution of the statement, even though the user may have the operation-specific privilege to perform the operation of the statement for the rows over which the statement is run.

Based on SQL 92 standard, instance 142 prevents data leakage with DML, statements using a parameter. When this parameter is set, upon execution of a DML operation such as UPDATE or DELETE, instance 142 also checks for SELECT privilege for the accessed data to avoid information disclosure. Embodiments of fine-grained access control on DML operations require that users should also have SELECT privilege on the cells as well as the applicable DML privilege.

Another way that data leakage may occur is through a DML statement with a RETURNING INTO clause. For example, while Ann only has SELECT privilege in Realm 372, and has only UPDATE privilege in Realm 374, Ann executes the following query over table 370:

UPDATE hr.employees SET dept_id=60
    WHERE emp_id=104
        RETURNING salary INTO 1_salary;

Because the record where EMP_ID=104 is in data realm 374, Ann is allowed to update the record. However, since she does not have SELECT privilege in data realm 374, she cannot see data in the record. Nevertheless, using the above query within a PL/SQL function, the returned value discloses the SALARY value to which Ann does not have SELECT privilege. Hence, according to one or more embodiments, instance 142 checks SELECT privilege and column-level privileges data referred to within RETURNING INTO clauses.

UPDATE: If any column from the table appears in the RETURNING INTO clause, SELECT privilege is checked. If any protected column appears in the RETURN ING clause, that column privilege is also checked. Parameter SQL92_SECURITY is set to TRUE, SELECT privilege checked. If any protected column appears in the WHERE clause of the user query block, that column privilege is also checked.

INSERT: INSERT statement with RETURNING INTO clause enforces SELECT privilege. And if a protected column appears in RETURNING INTO clause, that column privilege is also checked. When Parameter SQL92_SECURITY is set to TRUE, SELECT privilege is not checked for INSERT, as INSERT statement does not have a WHERE clause to disclose data. Unlike an UPDATE statement when the parameter SQL92_SECURITY is set to TRUE, checking SELECT privilege is not required since an INSERT statement does not have a WHERE clause to disclose data DELETE: If protected columns appear in RETURNING INTO clause, SELECT privilege is checked. Also column privileges are checked if corresponding protected columns appear in the RETURNING INTO clause. When SQL92_SECURITY is set to TRUE, SELECT privilege is checked for DELETE to avoid data disclosure.

Implied Operation-Specific Privilege for Column-Level Privileges

At times, it is necessary to have even more fine-grained control of data access operations i.e., SELECT, INSERT, UPDATE, or DELETE, that can be performed within the cells of a table. To illustrate the issue, returning to examples based on sample table 320, HR.EMPLOYEES, instance 142 receives one or more DDL statements that establish the following data security policies for HR.EMPLOYEES table 320:

a first ACL (that grants UPDATE privilege and manageSalary privilege 324 to a user Ann) is mapped to data realm 302 defined by the SQL statement "Dept_Id=90"; and a second ACL (that grants SELECT privilege and manageJob privilege 322 to the user role Managers, in which Ann participates) is mapped to a data realm 302.

Thus, Ann has UPDATE and manageSalary privileges granted within data realm 302 and also has SELECT and manageJob privileges granted within the same data realm 302.

According to embodiments, column-level privileges are not operation type-specific. Thus, granting a column-level privilege allows the user to perform any operations that the user is authorized to do within the appropriate data realm. To illustrate, according to such embodiments, grants of UPDATE and manageSalary privileges as well as SELECT and manageJob privileges on the same data realm (as depicted in the example above) would result in granting both SELECT and UPDATE for both of the protected columns.

Thus, according to one embodiment, User Privilege data security policies allow definition of column-level privileges that are explicitly associated with one or more data access operations. Granting such a column-level privilege implies grant of the explicitly associated data access operations for the column protected by the column-level privilege. For example, instance 142 receives one or more DDL statements that establish a particular column-level privilege, manageSalary, that protects the SALARY column of HR.EMPLOYEES and is explicitly associated with SELECT and UPDATE privileges. A user that is granted this manageSalary privilege within a particular data realm may perform SELECT and UPDATE operations on values within the SALARY column without regard to operation-specific privileges granted to the user for that data realm (including other privileged columns).

According to another embodiment, multiple data security policies are defined to implement fine-grained type-specific privilege. In this embodiment, within the Data Security model is defined a separate data security policy for each type of data access operation (i.e., SELECT, INSERT, UPDATE, or DELETE). To illustrate in the context of table 320, instance 142 receives one or more DDL statements that establish the following data security policies for HR.EMPLOYEES table 320:

a first ACL (that grants UPDATE privilege and manageSalary privilege 324 to a user Ann) is mapped to data realm 302 defined by the SQL statement "Dept_Id=90"; and a second ACL (that grants SELECT privilege and manageJob privilege 322 to the user role Managers, in which Ann participates) is mapped to a data realm 302.

Thus, a first data security policy is defined that grants UPDATE and manageSalary to Ann for data realm 302. A second data security policy is concurrently defined, which grants SELECT and manageJob to Ann for the same data realm 302. In this embodiment, each such data security policy represents an explicit association of a column-level privilege with a data access operation as described above. These data security policies do not affect columns that are not protected by the indicated column-level privileges. In other words, other data security policies would need to be established to grant data access operation privileges to users for other protected and for the non-protected columns of table 320.

According to another embodiment, implied privilege is used to indicate statement type for fine-grained type-specific privilege. Specifically, according to this embodiment, a data access operation type is indicated for a given column privilege. To illustrate in the context of the above example, a grant of manageJob privilege in a data realm implies SELECT privilege for values in the column JOB_ID, and a grant of manageSalary in a data realm implies UPDATE privilege for values in the column SALARY.

Furthermore, according to one or more embodiments, multiple column-level privileges are defined for a particular protected column, where each column-level privilege for the column is associated with a different set of data access operation types. For example, a defined manageJobSelect privilege on the JOB_ID column is explicitly associated with the data access operation type SELECT and a concurrently defined manageJobUpdate privilege on the JOB_ID column is explicitly associated with the data access operation types SELECT and UPDATE.

SQL Grammar for Fine-Grained Object Privileges

The above description is for a policy-based system that uses PL/SQL Application Programming Interfaces (APIs) to declare privileges and associate privileges with column-level DML authorization. According to one or more embodiments, a DBMS implements SQL-based database privilege definitions for fine-grained privileges for DML statements. For example, the SQL-based database privilege definitions have the following grammar (using Backus-Nuar Form (BNF) syntax):

<privilege>::=PRIVILEGE <sql identifier><target>[ACTION <action> . . . ]

<target>::=OBJECT <sql identifier>[COLUMN<sql identifier> . . . ] [ROW <sql predicate>]

<action>::=SELECT|INSERT|UPDATE|DELETE

In the variant of BNF syntax presented above, [ ] represents optional terms, { } represents a list of single terms, | represents a choice, . . . represents repetition of the preceding element, and capitalized TERMS are reserved tokens. Hence, a privilege is defined with a name, a target, and, optionally, a list of actions. The target is an object (i.e., a table or a view), optionally with a column list, and a SQL predicate that represents protected rows of the object. An action is a data access operation type, i.e., SELECT, INSERT, UPDATE, or DELETE. For example, the fine-grained privileges manageJob and manageSalary are defined as:

privilege manageJob object Employees column Job_Id row "Dept_Id=90" action select privilege manageSalary object Employees column Salary row "Dept_Id=90" action update Semantically, these privilege definitions are equivalent to view definitions where the column list filters columns of the object and the row predicate filters rows (i.e., where the row predicates represent data realms). The column tag lists columns where access is granted. To express all columns of an object, default values for a column can be set to "all" and default values for a row predicate can be set to "1=1" or TRUE. Hence SELECT on an Employees table is defined as:

privilege SELECT_ALL_PO object Employees action select

The naming of object privileges does not result in inconsistencies with existing object-level SQL grant statements that identifies a privilege based solely on the action and an object name, as both forms of grants can co-exist.

Enforcement of Fine-Grained Data Access Control

Figure 4:
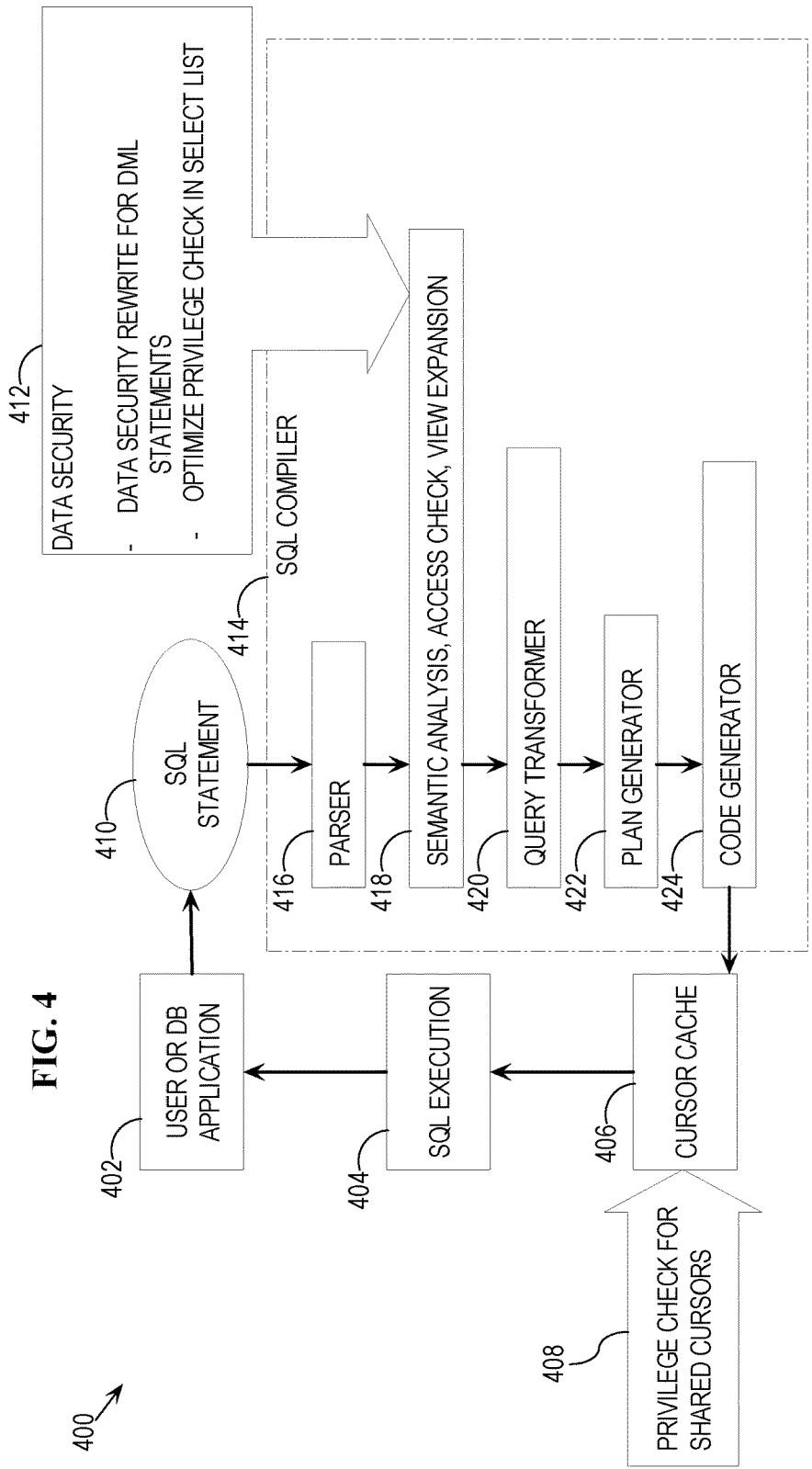
FIG. 4 depicts a flowchart for enforcement of fine-grained control of data change operations in the context of the steps of SQL compilation and execution by a SQL compiler.

Flowchart 400 of FIG. 4 depicts enforcement of fine-grained control of data change operations in the context of the steps of SQL compilation and execution by a SQL compiler. SQL is used herein as an exemplary query language, and any query language may be used according to one or more embodiments.

At step 402, flowchart 400 depicts a user or DB application (such as database client 112) submitting a SQL statement 410 to a SQL compiler 414, which compiler is implemented by database server instance 142. At step 416, a parser validates that SQL statement 410 conforms to a valid grammar. At step 418, compiler 414 identifies a sematic meaning for one or more target object, such as table or view, in SQL statement 410, which is described, at least partly, in U.S. patent application Ser. No. 14/313,872, titled "Optimized Enforcement Of Fine Grained Access Control On Data" incorporated by reference above. During this semantic analysis, instance 142 checks to see if the user has access to the portions of the object table in SQL statement 410 based on the data security policies established for the table. This semantic analysis uncovers references to data within columns of the table that are not shown in the select list for the DML, statement, such as references to protected columns within RETURNING INTO or WHERE clauses, i.e., that could potentially cause data leakage as described above. As indicated at step 412, the view expansion includes a Data Security Definition rewrite that comprises a data security rewrite for DML, statements and optimized privilege check in the select list as described in further detail below.

Specifically, instance 142 expands the reference to the object table in SQL statement 410 with a view definition that is based on the table and also on the data security policies established for that table. Instance 142 transforms the rewritten SQL query, at step 418, in order to optimize the query, as described in further detail in U.S. Pat. No. 9,043,309, titled "SQL Transformation-Based Optimization Techniques For Enforcement Of Data Access Control", incorporated by reference above. However in that Patent U.S. Pat. No. 9,043,309, rewrite is performed for only SELECT operation. Here we have introduced new rewrites for DELETE, INSERT, and UPDATE. At step 420, the query is further rewritten by the optimizer layer based on various optimization rules. At step 422, instance 142 generates a plan for the rewritten SQL query and at step 424, instance 142 generates code for the rewritten SQL statement and creates a cursor based on the compiled SQL statement.

Instance 142 stores these compiled SQLs, termed cursors, in cursor cache 406. At step 404, instance 142 executes SQL statement 410 based on the cursor for SQL statement 410 in cursor cache 406. Furthermore, the cursors in cursor cache 406 can be executed by other users who have the same authorizations on the tables referenced in the cursors. Hence, in cursor cache 406, instance 142 maintains the privilege check results for the cursor for SQL statement 410. At step 408, instance 142 compares these maintained privilege check results, for a given shared cursor, with the privilege check results of users executing the shared cursor.

Data Access Control Optimization Through Query Rewrite

Embodiments enforce fine-grained access control by rewriting query statements that access protected data. During the statement rewrite, if the access type of a statement over a particular database object is a data change type (UPDATE/INSERT/DELETE), then, during view expansion, all privileges on protected columns are checked and, according to one or more embodiments, the predicates generated by the privilege checks are tagged. For UPDATE and INSERT statements, instance 142 only checks a column privilege if the column is modified or accessed as part of the query.

However, during the view expansion at step 418 of flowchart 400, not all information about which columns a particular statement accesses is available due to recursive descent of SQL compiler 414. According to one or more embodiments, a two-phase rewrite approach ensures that all column-level privileges for protected columns accessed by a particular statement are checked, without checking unneeded column-level privileges, and without access to information about which protected columns are accessed that are not in the column list for the statement. FIG. 5 depicts a flowchart 500 for enforcing fine-grained access control via a two-phase statement rewrite.

At step 502 of flowchart 500, a plurality of column-level privileges are maintained for a particular table within a database, where each of the plurality of column-level privileges protects a respective column of the particular table. For example, instance 142 receives one or more DDL statements that establish manageJob privilege 322 and manageSalary privilege 324 to protect data in the JOB_ID and SALARY columns, respectively, of the HR.EMPLOYEES table, as depicted in table 320 of FIG. 3B.

At step 504, a DML statement that performs a data change operation over data in the particular table is received. For example, instance 142 receives the following SQL statement via a database session established to connect a user to database 160:

UPDATE hr.employees set SALARY=SALARY+10;

The particular data change operation of this example query is UPDATE. According to one or more embodiments, data change operations include any of the following DML operations: UPDATE, DELETE, and INSERT.

According to one or more embodiments, steps 506-510 are performed in response to receiving the DML statement.

At step 506, the DML statement is rewritten to produce a first updated DML statement that references each of the plurality of column-level privileges. For example, during a first phase of statement rewrite, instance 142 checks all column-level privileges for the target object of the statement received in step 504, and identifies corresponding data security predicates, i.e., during view expansion at step 418 of flowchart 400. During this first phase of statement rewrite, instance 142 replaces the reference to the target table HR.EMPLOYEES with a view expansion that checks all column-level privileges for HR.EMPLOYEES as indicated in the following revised statement:

```
UPDATE (
    SELECT EMP_ID, NAME, JOB_ID, SALARY, DEPT_ID
        FROM HR.EMPLOYEES EMPLOYEES
        WHERE CHECK_PRIVILEGE('UPDATE',
            'ACL1','DEPT_ID =90',
            'ACL2','DEPT_ID IN (60, 100)') =1
        AND CHECK_PRIVILEGE('manageSalary'
            'ACL1','DEPT_ID =90',
            'ACL2','DEPT_ID IN (60, 100)') =1
        AND CHECK_PRIVILEGE('manageJob'
            'ACL1','DEPT_ID =90',
            'ACL2','DEPT_ID IN (60, 100)') =1
    WITH CHECK OPTION
) "employees"
SET salary = salary + 10;
```

In this example, only two ACLs (ACL1, and ACL2) are used for data security policies for HR. EMPLOYEES.

At step 508, the first updated DML statement is rewritten to produce a second updated DML statement that references a strict subset of the plurality of column-level privileges, where each column, protected by each column-level privilege of the strict subset of the plurality of column-level privileges, is accessed by the DML statement. For example, in the second rewrite phase, after instance 142 performs semantic analysis (step 418) and right before instance 142 performs view merging and transformation (step 420), instance 142 removes unnecessary column privilege checks from the rewritten statement. Specifically, based on compilation of the DML statement, including semantic analysis, instance 142 identifies the set of protected columns that are referenced within the SQL statement. Instance 142 rewrites the first updated DML statement, to produce a second updated DML statement in which only those column-level privileges that protect columns actually accessed in the DML statement are checked.

Also during the second phase, instance 142 updates the authorization check results for the cursor of the statement. Specifically, instance 142 removes, from the cursor, data privilege checks and ACL results for those column privileges that are not required to be checked as part of the query execution. According to one or more embodiments, predicates generated by the column privilege check that do not need to be checked are also removed during the second phase of statement rewrite.

To illustrate in the context of the previous example, after instance 142 performs semantic analysis on the SQL statement, instance 142 determines that only the protected column SALARY is accessed in the statement. As such, instance 142 prunes the privilege check for the column-level privilege manageJob from the view expansion of the object of the statement, as follows:

```
UPDATE (
    SELECT EMP_ID, NAME, JOB_ID, SALARY, DEPT_ID
        FROM HR.EMPLOYEES EMPLOYEES
        WHERE CHECK_PRIVILEGE('UPDATE',
            'ACL1','DEPT_ID =90',
            'ACL2','DEPT_ID IN (60, 100)') =1
        AND CHECK_PRIVILEGE('manageSalary'
            'ACL1','DEPT_ID =90',
            'ACL2','DEPT_ID IN (60, 100)') =1
    WITH CHECK OPTION
) "employees"
SET salary = salary + 10;
```

In this second updated DML, statement, with the expanded table definition as a view, in addition to the row-level privilege checks, only the required column privileges are checked to filter the rows. Unauthorized rows in data realm 304 are filtered out due to lack of manageSalary privilege for those rows.

Instance 142 also removes ACL results for the column-level privilege manageJob from the cursor compiled for the statement. In this way, during the second phase of the statement rewrite, instance 142 removes redundant predicates from the query rewrite and from the query cursor.

At step 510 of flowchart 500, the second updated DML statement is executed. For example, instance 142 finishes compiling the second updated DML statement. Instance 142 executes the compiled DML statement in the cursor produced for the DML statement. This execution will execute the data change operation as allowed based on the privileges granted to the user that submitted the statement. For example, the user Ann has UPDATE privilege on both data realms 302 and 304 of table 320, as well as manageSalary granted in Realm 302 (Dept_ID=90). In this example, instance 142 updates table 320 as depicted in results table 330 of FIG. 3B in which only values in the SALARY column within data realm 302 are updated.

According to one or more embodiments, instance 142 expands the CHECK_PRIVILEGE operators, in a rewritten statement, to one or more equivalent SQL predicates. According to such embodiments, instance 142 performs the first phase of the statement rewrite as follows, in which SQL predicates (instead of corresponding CHECK_PRIVILEGE operators) are used to check privileges for the statement:

```
(SELECT * FROM "HR"."EMPLOYEES" "EMPLOYEES" WHERE
(dept_id in (90, 60) or dept_id in (60, 100))
AND
((dept_id in (90, 60)
AND
(dept_id in (60, 100)))
WITH CHECK OPTION);
```

Here "CHECK_PRIVILEGE('UPDATE', 'ACL1', 'DEPT_ID=90', 'ACL2', 'DEPT_ID IN (60, 100)')=1" is written as "dept_id in (90, 60) or dept_id in (60, 100))" as executing user Ann has UPDATE privilege on both the realms. However, "CHECK_PRIVILEGE('manageSalary', 'ACL1', 'DEPT_ID=90', 'ACL2', 'DEPT_ID IN (60, 100)')=1" is written as (dept_id in (90, 60)" as Ann has manageSalary privilege for this realm. The rewrite is performed similarly for the "manageJob" privilege.

During the second phase of the rewrite, instance 142 prunes redundant predicates from the rewritten DML, operation. To be able to prune redundant privilege check, instance 142 maintains the position for the corresponding predicates. Continuing with the above example, instance 142 identifies the second (dept_id=(60, 100)) predicate in the rewritten statement as redundant and prunes that predicate from the statement.

With respect to an INSERT-type statement, instance 142 performs the two-phase rewrite as follows. To be able to insert data into a particular data realm, the user is required to have both INSERT privilege and column privileges for each protected columns in the VALUES clause. For example, the following INSERT statement is executed over sample table 310, where the statement adds column values for both JOB_ID and SALARY columns:

INSERT into hr.employees values (102, 'Lex', 'AD_VP', 17000, 90);

Instance 142 rewrites this INSERT-type DML, statement, which is illustrated as follows, in order to enforce the data security policies:

```
INSERT INTO
    (SELECT EMP_ID, NAME, JOB_ID, SALARY, DEPT_ID
        FROM HR.EMPLOYEES EMPLOYEES
        WHERE CHECK_PRIVILEGE('INSERT',
            'ACL1','DEPT_ID =90',
            'ACL2','DEPT_ID IN (60, 100)') =1
        AND
        CHECK_PRIVILEGE('manageSalary,
            'ACL1','DEPT_ID =90',
            'ACL2','DEPT_ID IN (60, 100)') =1
        AND
        CHECK_PRIVILEGE('MANAGEJOB',
            'ACL1','DEPT_ID =90',
            'ACL2','DEPT_ID IN (60, 100)') =1
    WITH CHECK OPTION
) "employees"
values (102, 'Lex', 'AD_VP', 17000, 90);
```

Since, in this example SQL statement, the INSERT operation inserts values into both protected columns in table 310, instance 142 does not prune any of the column-level privilege checks from the DML statement during the second phase of statement rewrite.

According to one embodiment, in the context of a DELETE-type DML statement, instance 142 only checks DELETE privilege, and column privileges are not checked. According to another embodiment, for a DELETE-type DML statement, instance 142 checks both DELETE privilege as well as all applicable column-level privileges.

Furthermore, as described above, if a DELETE statement has a RETURNING INTO clause and protected columns appear in the RETURNING INTO clause, instance 142 checks SELECT privilege as well as column privileges of corresponding protected columns that appear in the clause. For example, the following DELETE statement is executed with a RETURNING INTO clause where a protected SALARY column value is returned:

DELETE FROM hr.employees WHERE employee_id=103 RETURNING salary INTO l_salary;

In the first phase of query rewrite, instance 142 rewrites this DELETE-type DML, statement as follows in order to enforce the data security policies:

```
DELETE FROM (
    SELECT EMP_ID, NAME, JOB_ID, SALARY, DEPT_ID
        FROM HR.EMPLOYEES EMPLOYEES
            WHERE CHECK_PRIVILEGE('DELETE',
                'ACL1','DEPT_ID =90',
                'ACL2','DEPT_ID IN (60, 100)')=1
            AND
            CHECK_PRIVILEGE('SELECT',
                'ACL1','DEPT_ID =90',
                'ACL2','DEPT_ID IN (60, 100)')=1
            AND
            CHECK_PRIVILEGE('manageSalary',
                'ACL1','DEPT_ID =90',
                'ACL2','DEPT_ID IN (60, 100)')=1
            AND
            CHECK_PRIVILEGE('manageJob',
                'ACL1','DEPT_ID =90',
                'ACL2','DEPT_ID IN (60, 100)')=1
) "employees"
WHERE employee_id = 103
RETURNING salary INTO l_salary;
```

During the second phase of query rewrite, after semantic analysis of the DELETE statement, instance 142 determines that the protected column JOB_ID is not referred to in the statement. As such, instance 142 rewrites the DELETE statement as follows to optimize enforcement of the data security policies:

```
DELETE FROM (
    SELECT EMP_ID, NAME, JOB_ID, SALARY, DEPT_ID
        FROM HR.EMPLOYEES EMPLOYEES
            WHERE CHECK_PRIVILEGE('DELETE',
                'ACL1','DEPT_ID =90',
                'ACL2','DEPT_ID IN (60, 100)')=1
            AND
            CHECK_PRIVILEGE('SELECT',
                'ACL1','DEPT_ID =90',
                'ACL2','DEPT_ID IN (60, 100)')=1
            AND
            CHECK_PRIVILEGE('manageSalary',
                NULL, NULL,
                'ACL1','DEPT_ID =90',
                'ACL2','DEPT_ID IN (60, 100)')=1
) "employees"
WHERE employee_id = 103
RETURNING salary INTO l_salary;
```

As shown in the description and examples above, during the two-phase rewrite, instance 142 replaces the reference to the object of the statement with a view expansion that results in original column names (rather than virtual columns) appearing in the column list for the inline view. For UPDATE and INSERT statements, WITH CHECK OPTION is appended to the end of the inline view definition. In addition, when parameter SQL92_SECURITY is used or a data change operation statement has RETURNING INTO clause, the SELECT privilege is added to the CHECK_PRIVILEGE operator for the row-level privilege check.

Optimize Privilege Check in Column List

As a further illustration for optimizing privilege check, a table T has 3 columns: C1, C2, and C3. The Data Security policy on the table is represented as an ordered list:

{a1, realm1, . . . , aN, realmN}
    where, acl1, acl2, . . . , aclN are ACLs
    and realm1, . . . , realmN are Data Realms expressed using SQL predicates The following extends the rewrite for a SELECT statement.

```
select C1, C2, C3
    from
    (select decode (C1_1, 1, C11, NULL) C1, C2, C3
        from (
        select C1 C11,
            case when ORA_CHECK_ACL (cp1, ORA_GET_ACLIDS( t,
                'cp1', 'C1') =1
                then 1 else 0 end C1_1,
            C2, C3
            from T t
                where CHECK_PRIVILEGE (SELECT , acl1, realm1...,
                    aclN realmN)=1
        )
    );
```

In this example, "decode (C1_1, 1, C11, NULL) C1, C1_1" represents the concept that if C1_1 is true, then the original column is returned. Further, "select C1 C11" renames the original column from "C1" to "C11". Also, "case when ORA_CHECK_ACL (cp1, ORA_GET_ACLIDS (t, 'cp1', 'C1')=1 then 1 else 0 end C1_1" places the authorization result for the referenced column into the variable "C1_1". Furthermore, "where CHECK_PRIVILEGE (SELECT, acl1, realm1, . . . , aclN, realmN)=1" provides row-level access control for the SELECT statement.

According to one or more embodiments, fine-grained data security control is implemented using a rewrite technique for ORA_GET_ACLIDS operator that instance 142 uses for column authorization. The ORA_GET_ACLIDS operator optimizes column-level security by causing instance 142 to identify only those ACLs (identified by ACLIDs or ACL identifiers) that grant the specific column-level privileges that need to actually be checked, given the user identity and the query information. As such, use of the operator ORA_GET_ACLIDS results in a rewrite, for SELECT statements, in which unused operators and predicates are removed at runtime.

According to one or more embodiments, the use of ORA_GET_ACLIDS within a case statement for column authorization check is optimized. To illustrate, a column C1 within a table T is protected with the privilege cp1. Previous to embodiments, in response to receiving a SELECT statement that selects data from C1 in table T, cp1 privilege would be checked for the SELECT statement using the following:

ORA_CHECK_ACL (cp1, ORA_GET_ACLIDS(t, 'cp1', 'C1'))=1

During compilation of the SQL, instance 142 replaces ORA_GET_ACLIDS with the ACLIDs that identify those ACLs that grant cp1 over column C1 in table T. In this example, there are three data-realms associated with three different ACLs: {(acl1, realm1), (acl2, realm2), (acl3, realm3)}. As such, previous to embodiments, the above ORA_GET_ACLIDS(T) is rewritten as the following illustrates:

((SELECT 'acl1' FROM DUAL" " WHERE realm1)
∥(SELECT 'acl2' FROM DUAL WHERE realm2)
∥(SELECT 'acl3' FROM "DUAL WHERE realm3))

Hence the above operator is rewritten as
ORA_CHECK_ACL (cp1,
(SELECT 'acl1' FROM DUAL WHERE realm1)
∥(SELECT 'acl2' FROM DUAL WHERE realm2)
∥(SELECT 'acl3' FROM DUAL WHERE realm3))
)=1

In contrast, according to one or more embodiments, instance 142 rewrites ORA_GET_ACLIDS more optimally in light of which privileges need to be checked for a given statement. Specifically, according to one or more embodiments, the following form of the operator call is optimized:

ORA_CHECK_ACL (cp1, ORA_GET_ACLIDS(t, 'cp1', 'C1'))=1

ORA_CHECK_ACL receives two parameters: a list of privileges that protect the column referenced by the SELECT statement, and an ORA_GET_ACLIDS call. In the above example, the SELECT statement selects data in a column that is protected by a column-level privilege "cp1".

By using ORA_CHECK_ACL, instance 142 takes into account applicable column-level privileges when implementing the ORA_GET_ACLIDS operator. Taking into account only those privileges that protect data that SELECT statement selects is similar to the problem described above in connection with row-level data security. According to one or more embodiments, instance 142 determines that the user (that submitted the SELECT statement that instance 142 is checking for data access privileges) is granted the column-level privilege cp1 only in ACL1. In response to determining that the user is granted cp1 in only ACL1, the rewrite of ORA_GET_ACLIDS is simplified to only check the privilege, cp1, as granted in ACL1, which is illustrated as follows:

(CASE WHEN REALM1 THEN 1 ELSE 0 END)

This above predicate replaces the ORA_CHECK_ACL operator.

For example, while only the SALARY column of the HR.EMPLOYEES table is protected by a view_salary privilege for the data realm DEPT_ID=90, a particular user submits the following SELECT statement to instance 142 for execution:

select SALARY from employees;

Prior to embodiments, rewrite for the column security is as follows, which will encode all of the ACLs within the rewrite:

```
select SALARY
  from
    (select EMP_ID, JOB_ID, DEPT_ID
  decode (SALARY_1, 1, SALARY1, NULL) SALARY
    from (
      select EMP_ID, JOB_ID, DEPT_ID ,
        SALARY SALARY1,
          case when ORA_CHECK_ACL ('VIEW_SALARY',
            (SELECT 'ACL1' FROM DUAL WHERE
              DEPT_ID=90)
            || (SELECT 'ACL2' FROM DUAL WHERE
              DEPT_ID in (60,100)) )=1
          then 1 else 0 end SALARY_1,
```

-continued

```
    from employees
      where CHECK_PRIVILEGE (SELECT ,
                ACL1,DEPT_ID=90,
                ACL2, DEPT_ID in (60,100))=1
    )
);
```

In contrast, according to one or more embodiments, instance 142 rewrites the SELECT statement, submitted by the user, to enforce column-level security as follows:

```
select SALARY
  from
    (select EMP_ID, JOB_ID, DEPT_ID
  decode (SALARY_1, 1, SLALRY1, NULL) SALARY
    from (
      select EMP_ID, JOB_ID, DEPT_ID ,
        SALARY SALARY1,
          case when DEPT_ID=90
            then 1 else 0 end SALARY_1,
          from employees
            where CHECK_PRIVILEGE (SELECT ,
                ACL1,DEPT_ID=90,
                ACL2, DEPT_ID in (60,100))=1
    )
);
```

In the rewritten operation, the ORA_CHECK_ACL operator is completely removed. Also only the data realms, in which the user has access to the columns, are incorporated in the column privilege check condition used in the DECODE statement.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
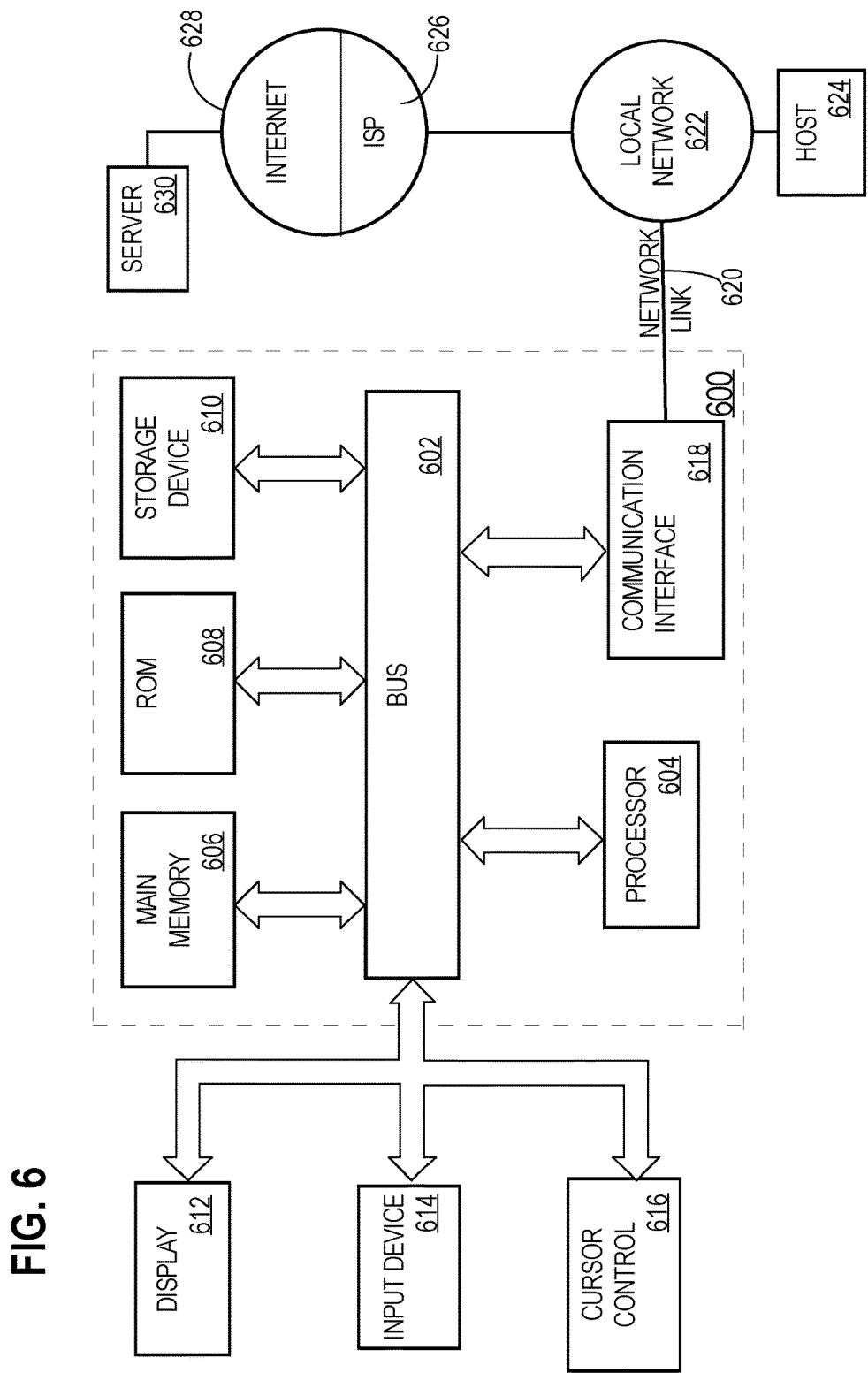
FIG. 6 is a block diagram of a computer system on which embodiments may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:
1. A method comprising:
  receiving one or more data definition language (DDL) statements that establish one or more privilege rules that assign an operation-specific privilege to a particular user to perform a particular data change operation within a particular set of rows in a particular table within a database;

wherein the particular data change operation is one of: insert, delete, or update;
receiving a data manipulation language (DML) statement, from the particular user, that performs the particular data change operation over data stored within the particular set of rows;
based, at least in part, on the one or more privilege rules, allowing the particular data change operation over the data stored within the particular set of rows;
wherein the method is performed by one or more computing devices.

2. The method of claim 1, wherein:
the one or more privilege rules assign the operation-specific privilege, to perform the particular data change operation, to the particular user within the particular set of rows by:
  mapping a particular access control list (ACL) to the particular set of rows in the particular table;
  wherein the particular ACL maps particular user data, associated with the particular user, to the operation-specific privilege; and
allowing the particular data change operation over the data stored within the particular set of rows, based, at least in part, on the one or more privilege rules, comprises:
  identifying, based on the one or more privilege rules, the particular ACL that is mapped to the particular set of rows;
  determining that the identified particular ACL maps the particular user data, associated with the particular user, to the operation-specific privilege to perform the particular data change operation specified by the DML statement; and
  in response to determining that the identified particular ACL maps the particular user data to the operation-specific privilege, allowing the particular data change operation over the data stored within the particular set of rows.

3. The method of claim 1, wherein:
the one or more privilege rules further assign a column-level privilege, to perform operations on data within a particular column of the particular table, to the particular user within the particular set of rows;
the DML statement specifies the particular data change operation over second data stored within both the particular column and the particular set of rows; and
the method further comprises:
  determining whether the one or more privilege rules assign the particular user both (a) the operation-specific privilege to perform the particular data change operation, and (b) the column-level privilege to perform operations on data within the particular column of the particular table;
  in response to determining that the one or more privilege rules assign the particular user both (a) the operation-specific privilege, and (b) the column-level privilege, allowing the particular data change operation over the second data stored within both the particular column and the particular set of rows.

4. The method of claim 3, wherein allowing the particular data change operation over the data stored within the particular set of rows further comprises:
determining, based at least in part on the one or more privilege rules, whether the particular user is authorized to select particular data that is referenced within a WHERE clause of the DML statement; and
in response to determining that the particular user is authorized to select the particular data that is referenced within the WHERE clause of the DML statement, allowing the particular data change operation over the data stored within the particular set of rows.

5. The method of claim 3, wherein allowing the particular data change operation over the data stored within the particular set of rows further comprises:
determining, based at least in part on the one or more privilege rules, whether the particular user is authorized to select particular data that is referenced within a RETURNING INTO clause of the DML statement; and
in response to determining that the particular user is authorized to select the particular data that is referenced within the RETURNING INTO clause of the DML statement, allowing the particular data change operation over the data stored within the particular set of rows.

6. The method of claim 1, wherein:
the one or more privilege rules further assign a column-level privilege, that is explicitly associated with one or more particular data change operations for data within a particular column of the particular table, to the particular user within the particular set of rows;
the DML statement specifies the particular data change operation over second data stored within both the particular column and the particular set of rows; and
the method further comprises:
  determining whether the one or more particular data change operations for the column-level privilege, assigned to the particular user, comprises the particular data change operation;
  in response to determining that the one or more particular data change operations for the column-level privilege, assigned to the particular user, comprises the particular data change operation, allowing the particular data change operation over the second data stored within both the particular column and the particular set of rows.

7. The method of claim 1, wherein allowing the particular data change operation over the data stored within the particular set of rows comprises:
determining that the DML statement updates a plurality of values within a particular row of the particular set of rows;
in response to determining that the DML statement updates the plurality of values within the particular row of the particular set of rows:
  based, at least in part, on the one or more privilege rules, determining whether the particular user is authorized to update all of the plurality of values within the particular row,
  in response to determining that the particular user is authorized to update all of the plurality of values within the particular row, allowing the DML statement to update the plurality of values within the particular row, and
  in response to determining that the particular user is not authorized to update all of the plurality of values within the particular row, disallowing the DML statement to update the particular row.

8. A method comprising:
maintaining, for a particular table within a database, a plurality of column-level privileges;
wherein each of the plurality of column-level privileges protects a respective column of the particular table;

receiving a data manipulation language (DML) statement that performs a data change operation over data in the particular table;

in response to receiving the DML statement:

rewriting the DML statement to produce a first updated DML statement that references each of the plurality of column-level privileges;

identifying a set of protected columns that are referenced within the first updated DML statement;

based on the identified set of protected columns, rewriting the first updated DML statement to produce a second updated DML statement that references a strict subset of the plurality of column-level privileges;

wherein each column-level privilege of the strict subset of the plurality of column-level privileges protects a respective protected column of the identified set of protected columns that are referenced within the first updated DML statement; and executing the second updated DML statement;

wherein the method is performed by one or more computing devices.

9. The method of claim 8, further comprising:

performing semantic analysis of the DML statement;

wherein rewriting the first updated DML statement to produce the second updated DML statement is performed after performing the semantic analysis of the DML statement.

10. The method of claim 8, wherein rewriting the first updated DML statement to produce the second updated DML statement further comprises removing one or more redundant predicates from the first updated DML statement to produce the second updated DML statement.

11. One or more non-transitory computer-readable media storing one or more sequences of instructions which, when executed by one or more processors, cause:

receiving one or more data definition language (DDL) statements that establish one or more privilege rules that assign an operation-specific privilege to a particular user to perform a particular data change operation within a particular set of rows in a particular table within a database;

wherein the particular data change operation is one of: insert, delete, or update;

receiving a data manipulation language (DML) statement, from the particular user, that performs the particular data change operation over data stored within the particular set of rows;

based, at least in part, on the one or more privilege rules, allowing the particular data change operation over the data stored within the particular set of rows.

12. The one or more non-transitory computer-readable media of claim 11, wherein:

the one or more privilege rules assign the operation-specific privilege, to perform the particular data change operation, to the particular user within the particular set of rows by:

mapping a particular access control list (ACL) to the particular set of rows in the particular table;

wherein the particular ACL maps particular user data, associated with the particular user, to the operation-specific privilege; and allowing the particular data change operation over the data stored within the particular set of rows, based, at least in part, on the one or more privilege rules, comprises:

identifying, based on the one or more privilege rules, the particular ACL that is mapped to the particular set of rows;

determining that the identified particular ACL maps the particular user data, associated with the particular user, to the operation-specific privilege to perform the particular data change operation specified by the DML statement; and in response to determining that the identified particular ACL maps the particular user data to the operation-specific privilege, allowing the particular data change operation over the data stored within the particular set of rows.

13. The one or more non-transitory computer-readable media of claim 11, wherein:

the one or more privilege rules further assign a column-level privilege, to perform operations on data within a particular column of the particular table, to the particular user within the particular set of rows;

the DML statement specifies the particular data change operation over second data stored within both the particular column and the particular set of rows; and the one or more sequences of instructions further comprise instructions which, when executed by one or more processors, cause:

determining whether the one or more privilege rules assign the particular user both (a) the operation-specific privilege to perform the particular data change operation, and (b) the column-level privilege to perform operations on data within the particular column of the particular table;

in response to determining that the one or more privilege rules assign the particular user both (a) the operation-specific privilege, and (b) the column-level privilege, allowing the particular data change operation over the second data stored within both the particular column and the particular set of rows.

14. The one or more non-transitory computer-readable media of claim 13, wherein allowing the particular data change operation over the data stored within the particular set of rows further comprises:

determining, based at least in part on the one or more privilege rules, whether the particular user is authorized to select particular data that is referenced within a WHERE clause of the DML statement; and in response to determining that the particular user is authorized to select the particular data that is referenced within the WHERE clause of the DML statement, allowing the particular data change operation over the data stored within the particular set of rows.

15. The one or more non-transitory computer-readable media of claim 13, wherein allowing the particular data change operation over the data stored within the particular set of rows further comprises:

determining, based at least in part on the one or more privilege rules, whether the particular user is authorized to select particular data that is referenced within a RETURNING INTO clause of the DML statement; and in response to determining that the particular user is authorized to select the particular data that is referenced within the RETURNING INTO clause of the DML statement, allowing the particular data change operation over the data stored within the particular set of rows.

16. The one or more non-transitory computer-readable media of claim 11, wherein:

the one or more privilege rules further assign a column-level privilege, that is explicitly associated with one or more particular data change operations for data within a particular column of the particular table, to the particular user within the particular set of rows;

the DML statement specifies the particular data change operation over second data stored within both the particular column and the particular set of rows; and the one or more sequences of instructions further comprise instructions which, when executed by one or more processors, cause:

determining whether the one or more particular data change operations for the column-level privilege, assigned to the particular user, comprises the particular data change operation;

in response to determining that the one or more particular data change operations for the column-level privilege, assigned to the particular user, comprises the particular data change operation, allowing the particular data change operation over the second data stored within both the particular column and the particular set of rows.

17. The one or more non-transitory computer-readable media of claim 11, wherein allowing the particular data change operation over the data stored within the particular set of rows comprises:

determining that the DML statement updates a plurality of values within a particular row of the particular set of rows;

in response to determining that the DML statement updates the plurality of values within the particular row of the particular set of rows:

based, at least in part, on the one or more privilege rules, determining whether the particular user is authorized to update all of the plurality of values within the particular row, in response to determining that the particular user is authorized to update all of the plurality of values within the particular row, allowing the DML statement to update the plurality of values within the particular row, and in response to determining that the particular user is not authorized to update all of the plurality of values within the particular row, disallowing the DML statement to update the particular row.

18. One or more non-transitory computer-readable media storing one or more sequences of instructions which, when executed by one or more processors, cause:

maintaining, for a particular table within a database, a plurality of column-level privileges;

wherein each of the plurality of column-level privileges protects a respective column of the particular table;

receiving a data manipulation language (DML) statement that performs a data change operation over data in the particular table;

in response to receiving the DML statement:

rewriting the DML statement to produce a first updated DML statement that references each of the plurality of column-level privileges;

identifying a set of protected columns that are referenced within the first updated DML statement;

based on the identified set of protected columns, rewriting the first updated DML statement to produce a second updated DML statement that references a strict subset of the plurality of column-level privileges;

wherein each column-level privilege of the strict subset of the plurality of column-level privileges protects a respective protected column of the identified set of protected columns that are referenced within the first updated DML statement; and executing the second updated DML statement.

19. The one or more non-transitory computer-readable media of claim 18, wherein the one or more sequences of instructions further comprise instructions which, when executed by one or more processors, cause:

performing semantic analysis of the DML statement;

wherein rewriting the first updated DML statement to produce the second updated DML statement is performed after performing the semantic analysis of the DML statement.

20. The one or more non-transitory computer-readable media of claim 18, wherein rewriting the first updated DML statement to produce the second updated DML statement further comprises removing one or more redundant predicates from the first updated DML statement to produce the second updated DML statement.

21. A method comprising:

receiving one or more data definition language (DDL) statements that establish one or more privilege rules that establish a plurality of column-level privileges to perform operations over data within a plurality of protected columns, respectively, in a particular table within a database;

receiving a SELECT statement that selects data stored within one or more protected columns, of the plurality of protected columns;

rewriting the SELECT statement, to produce a rewritten SELECT statement, by:

for each protected column of the one or more protected columns:

identifying a set of ACLs that grant column-level privileges over the protected column;

identifying one or more data realms over which the SELECT statement operates for the protected column; and including, in the rewritten SELECT statement, a check of user privileges, for the protected column, based on the set of ACLs and the one or more data realms;

wherein the method is performed by one or more computing devices.

22. One or more non-transitory computer-readable media storing one or more sequences of instructions which, when executed by one or more processors, cause:

receiving one or more data definition language (DDL) statements that establish one or more privilege rules that establish a plurality of column-level privileges to perform operations over data within a plurality of protected columns, respectively, in a particular table within a database;

receiving a SELECT statement that selects data stored within one or more protected columns, of the plurality of protected columns;

rewriting the SELECT statement, to produce a rewritten SELECT statement, by:

for each protected column of the one or more protected columns:

identifying a set of ACLs that grant column-level privileges over the protected column;

identifying one or more data realms over which the SELECT statement operates for the protected column; and including, in the rewritten SELECT statement, a check of user privileges, for the protected column, based on the set of ACLs and the one or more data realms.

* * * * *

UNITED STATES PATENT AND TRADEMARK OFFICE
CERTIFICATE OF CORRECTION

PATENT NO. : 10,303,894 B2
APPLICATION NO. : 15/253608
DATED : May 28, 2019
INVENTOR(S) : Ahmed et al.

Page 1 of 2

It is certified that error appears in the above-identified patent and that said Letters Patent is hereby corrected as shown below:

In the Specification

In Column 1, Line 54, delete "DML," and insert -- DML --, therefor.

In Column 2, Line 67, delete "DML," and insert -- DML --, therefor.

In Column 3, Line 46, delete "DML," and insert -- DML --, therefor.

In Column 7, Line 64, delete "DML," and insert -- DML --, therefor.

In Column 8, Line 45, delete "DML," and insert -- DML --, therefor.

In Column 9, Line 22, delete "DML," and insert -- DML --, therefor.

In Column 12, Line 5, delete "DML," and insert -- DML --, therefor.

In Column 12, Line 51, delete "data" and insert -- data. --, therefor.

In Column 14, Line 27, delete "Backus-Nuar" and insert -- Backus-Naur --, therefor.

In Column 15, Line 21, delete "DML," and insert -- DML --, therefor.

In Column 15, Line 26, delete "DML," and insert -- DML --, therefor.

In Column 15, Line 36, delete "that patent" and insert -- that --, therefor.

In Column 17, Line 44, delete "DML," and insert -- DML --, therefor.

In Column 18, Line 26, delete "DML," and insert -- DML --, therefor.

Signed and Sealed this
Tenth Day of November, 2020

Andrei Iancu
*Director of the United States Patent and Trademark Office*

CERTIFICATE OF CORRECTION (continued)
U.S. Pat. No. 10,303,894 B2

In Column 18, Line 43, delete "DML," and insert -- DML --, therefor.

In Column 19, Line 18, delete "DML," and insert -- DML --, therefor.

In Column 19, Line 38, delete "l_salary;" and insert -- l_salary; --, therefor.

In Column 19, Line 62, delete "l_salary;" and insert -- l_salary; --, therefor.